United States Patent
Yeo

[11] Patent Number: 5,990,999
[45] Date of Patent: Nov. 23, 1999

[54] LIQUID CRYSTAL DISPLAY WITH A PROTECTION LAYER FORMED BY THE LAYER USED TO FORM THE PIXEL ELECTRODE

[75] Inventor: Ju-Cheon Yeo, Anyang, Rep. of Korea

[73] Assignee: LG Electronics, Inc., Rep. of Korea

[21] Appl. No.: 09/212,992

[22] Filed: Dec. 16, 1998

[30] Foreign Application Priority Data

Jun. 19, 1998 [KR] Rep. of Korea ................ 98-23049

[51] Int. Cl.⁶ .................................. G02F 1/1343
[52] U.S. Cl. ....................... 349/139; 349/140; 349/143
[58] Field of Search .................... 349/140, 143, 349/139

[56] References Cited

U.S. PATENT DOCUMENTS

| | | | |
|---|---|---|---|
| 5,412,240 | 5/1995 | Inoue et al. | 349/43 |
| 5,434,441 | 7/1995 | Inoue et al. | 349/43 |
| 5,737,049 | 4/1998 | Shin et al. | 349/122 |
| 5,757,453 | 5/1998 | Shin et al. | 349/122 |
| 5,835,169 | 11/1998 | Kwon et al. | 349/110 |
| 5,866,919 | 2/1999 | Kwon et al. | 349/110 |

Primary Examiner—William L. Sikes
Assistant Examiner—Heidi L. Eisenhut
Attorney, Agent, or Firm—Joseph R. Keating, Esq.; Graham & James LLP

[57] ABSTRACT

A liquid crystal display includes a substrate, an active layer on the substrate, the active layer having a source region, a channel region and a drain region, a gate line including a gate electrode, the gate electrode overlapping the channel region of the active layer and the gate line having a gate insulating layer disposed underneath, an insulating interlayer covering the exposed surface of the substrate including the gate line, a first contact hole and a second contact hole exposing portions of the source region and the drain region in the insulating interlayer, respectively, a data line including a source electrode on the insulating interlayer, the source electrode connected to the source region and the data line crossing over the gate line, a drain electrode on the insulating interlayer, the drain electrode connected to the drain region, a passivation layer covering the exposed surface of the substrate including the data line and the drain electrode, a third contact hole exposing a portion of the drain electrode on the passivation layer, a pixel electrode connected to the drain electrode on the passivation layer, and a first etching preventing layer covering the crossing portion of the gate lines and the data lines.

17 Claims, 8 Drawing Sheets

LIQUID CRYSTAL DISPLAY WITH A PROTECTION LAYER FORMED BY THE LAYER USED TO FORM THE PIXEL ELECTRODE

BACKGROUND OF THE INVENTION

1. Field of Invention

The present invention relates a Liquid Crystal Display ("LCD") and a method for fabricating an LCD which prevents a line open condition of conductive lines located at a step difference portion.

2. Discussion of Related Art

FIGS. 1 and 2 illustrate an LCD according to related art, in which FIG. 1 is a plan view and FIG. 2 is a cross-sectional view along a line I—I in FIG. 1.

An active layer 11 having a source region 11S, a channel region 11C and a drain region 11D is formed on a substrate 100. A gate line 13L includes a gate electrode 13G and overlaps the channel region 11C. A gate insulating layer is formed underneath the gate electrode 13G and the gate line 13L, and is thereby isolated with the active layer 11.

An insulating interlayer 14 is formed to cover the exposed surface of the substrate including the gate electrode 13G and the gate line 13L. Contact holes to expose portions of the source region 11S and the drain region 11D are formed in the insulating interlayer 14, respectively. A data line 15L having a source electrode 15S connected to the source region 11S is formed on the insulating interlayer 14.

A drain electrode 15D is connected to the exposed drain electrode 11D. Herein, the gate line 13L and the data line 15L cross over each other and define a matrix to form a plurality of pixel elements. A passivation layer 16 is arranged to cover the exposed surface of the substrate including the data line 15L. A contact hole to expose a portion of the drain electrode 15D is formed in the passivation layer 16. A pixel electrode 17 is formed on the passivation layer 16 and is connected to the exposed drain electrode 15D.

FIGS. 3A to 3D show cross-sectional views of a method of fabricating an LCD according to a related art shown in FIGS. 1 and 2.

Referring to FIG. 3A, an amorphous silicon layer is deposited on a substrate 100 and is crystallized. The crystallized silicon layer is etched via photolithography to form an active layer 11.

An insulating layer for forming a gate insulating layer and a conductive layer for forming a gate line are deposited sequentially on the exposed surface of the substrate including the active layer 11. The conductive layer is etched via photolithography to form a gate electrode 13G and a gate line 13L and then, the insulating layer is etched using the gate electrode 13G as a mask to form a gate insulating layer 12.

A source region 11S and a drain region 11D are formed in the active layer by doping impurities in the exposed portion of the active layer 11 using the gate line 13L and the gate electrode 13G as a doping mask. The channel region 11C is defined between the source region 11S and the drain regions 11D.

Referring to FIG. 3B, an insulating interlayer 14 is deposited on the exposed surface of the substrate including the gate line 13L and the gate electrode 13G. Then, contact holes H1 and H2 exposing the portions of the source region 11S and the drain region 11D are formed in the insulating interlayer 14, respectively, by etching the insulating interlayer 14 via photolithography.

A conductive layer for forming a data line including a source electrode and a drain electrode, for example, an Al layer, an Al alloy layer or the like, is deposited on the exposed surface of the substrate and etched via photolithography to form a source electrode 15S, a data line 15L and a drain electrode 15D. The source electrode 15S is connected to the source region 11S, the data line 15L is extended from the source electrode 15S and the drain electrode 15D is connected to the drain region 11D.

Referring to FIG. 3C, a passivation layer 16 is deposited on the exposed surface of the substrate and etched via photolithography to form a contact hole exposing a portion of the drain electrode 15D.

Referring to FIG. 3D, a transparent conductive layer 16, for example, Indium Tin Oxide ("ITO") layer is deposited on the exposed surface of the substrate and etched via photolithography to form a pixel electrode 17 connected to the drain electrode 15D.

However, there are disadvantages in that line open conditions occur in the gate line or the date line, especially at locations at or near the crossing portion of the gate line 15L and the data line 11L and the contact hole portions in the related art LCD. The line open condition is described as follows referring to FIG. 4.

FIG. 4 is a cross-sectional drawing showing the line open condition occurring during the manufacturing process of the LCD according to the related art.

The gate line 13L including the gate electrode 13G is formed on the substrate 100 and the insulating interlayer 14 is formed thereon. At a location where the step coverage of the insulating interlayer 14, which covers the portion of the step difference of the gate line 13L, is bad, the degree of the side slope increases more and more.

Since the conductive layer for forming the data line including the source electrode is deposited on the insulating interlayer 14 via a sputtering method, the step coverage of the conductive layer is very poor and the degree of the side slope increases more and more. Additionally, the passivation layer 16 is deposited on the data line 15L including the source electrode 15S and the drain electrode 15D having sloped sides. However, since the step coverage of the passivation layer 16 is bad, the passivation layer 16 is very thinly deposited on the slope portion.

Accordingly, stress is concentrated on the slope portion and then, cracks are generated in the conductive layer or insulating layer. Since the passivation layer 16 is deposited in the low temperature atmosphere, the rate of the occurrence of pin holes which cause line open conditions is higher in the slope portion than in any other portion.

Successively, the ITO layer for forming the pixel electrode is deposited on the passivation layer 16 and the ITO layer is etched by ITO etchant, which is a mixture solution of $FeCl_2$, HCl and $HNO_3$. The ITO etchant penetrates into the passivation layer 16 through the pin holes and cracks form and the ITO etchant melts the data line which includes the source electrode and the drain electrode, thereby causing an open line condition in the data line or the drain electrode.

SUMMARY OF THE INVENTION

To overcome the problems described above, preferred embodiments of the present invention provide a liquid crystal display and a method for fabricating a liquid crystal display which prevent an ITO etchant from penetrating into an insulating layer located at a side portion having a step difference and prevent damage or melting of the underlying conductive layer by allowing a portion of the ITO layer to remain at the side portion having the step difference so as to form at least one etching preventing layer.

Additional features and advantages of the present invention will be set forth in the description which follows and in part will be apparent from the description, or may be learned by practice of preferred embodiments of the present invention. The objectives and other advantages of the present invention will be realized and attained by the structure particularly explained in the written description and claims hereof as well as the appended drawings.

To achieve these and other advantages and in accordance with the purpose of the present invention, as embodied and broadly described, a preferred embodiment of the present invention includes a liquid crystal display including a substrate, an active layer on the substrate, the active layer having a source region, a channel region and a drain region, a gate line including a gate electrode, the gate electrode overlapping the channel region of the active layer and the gate line having a gate insulating layer disposed underneath, an insulating interlayer covering the exposed surface of the substrate including the gate line, a first contact hole and a second contact hole exposing portions of the source region and the drain region in the insulating interlayer, respectively, a data line including a source electrode on the insulating interlayer, the source electrode connected to the source region and the data line is arranged to cross over the gate line, a drain electrode on the insulating interlayer, the drain electrode connected to the drain region, a passivation layer covering the exposed surface of the substrate including the data line and the drain electrode, a third contact hole exposing a portion of the drain electrode on the passivation layer, a pixel electrode connected to the drain electrode on the passivation layer, and at least one etching preventing layer covering the crossing portion of the gate line and the data line.

In another preferred embodiment of the present invention, a liquid crystal display includes a gate line and a data line which cross over each other to form a plurality of pixel elements arranged in a matrix pattern and a thin film transistor including a source electrode of a data line, a drain electrode connected to a pixel electrode and a gate electrode of a gate line is used as a switching device, and including an etching preventing layer located at the crossing portion of the gate line and the data line, the etching preventing layer being formed from a material used for forming the pixel electrode.

In another preferred embodiment of the present invention, a method for fabricating a liquid crystal display includes the steps of forming an active layer on a substrate, forming a gate line including a gate electrode, the gate electrode overlapping a selected portion of the active layer and the gate line having a gate insulating layer lying underneath the gate line, forming an insulating interlayer to cover the exposed surface of the substrate including the gate line, forming a source region and a drain region in the active layer by doping impurities using the gate electrode as a doping mask, the selected portion of the active layer being defined as a channel region, forming a first contact hole exposing a portion of the source region and a second contact hole exposing a portion of the drain region in the insulating interlayer, forming a data line including a source electrode and a drain electrode on the insulating interlayer on the insulating interlayer, the source electrode connected to the source region and the data line crossing over the gate line and the drain electrode connected to the drain region, forming a passivation layer to cover the exposed surface of the substrate including the data line and the drain electrode, forming a third contact hole in the passivation layer to expose a portion of the drain electrode, and forming a pixel electrode and a first etching preventing layer on the passivation layer, the pixel electrode connected to the drain electrode and the first etching preventing layer covering the crossing portion of the gate line and the data line.

It is to be understood that both the foregoing general description and the following detailed description of preferred embodiments are exemplary and explanatory and are intended to provide further explanation of the present invention as claimed.

BRIEF DESCRIPTION OF THE ATTACHED DRAWINGS

The accompanying drawings, which are included to provide a further understanding of the present invention and are incorporated in and constitute a part of this application, illustrate preferred embodiments of the invention and together with the description serve to explain the principle of the invention.

DETAILED DESCRIPTION OF PREFERRED EMBODIMENTS

Reference will now be made in detail to the preferred embodiments of the present invention, an example of which is illustrated in the accompanying drawings.

Figure 1:
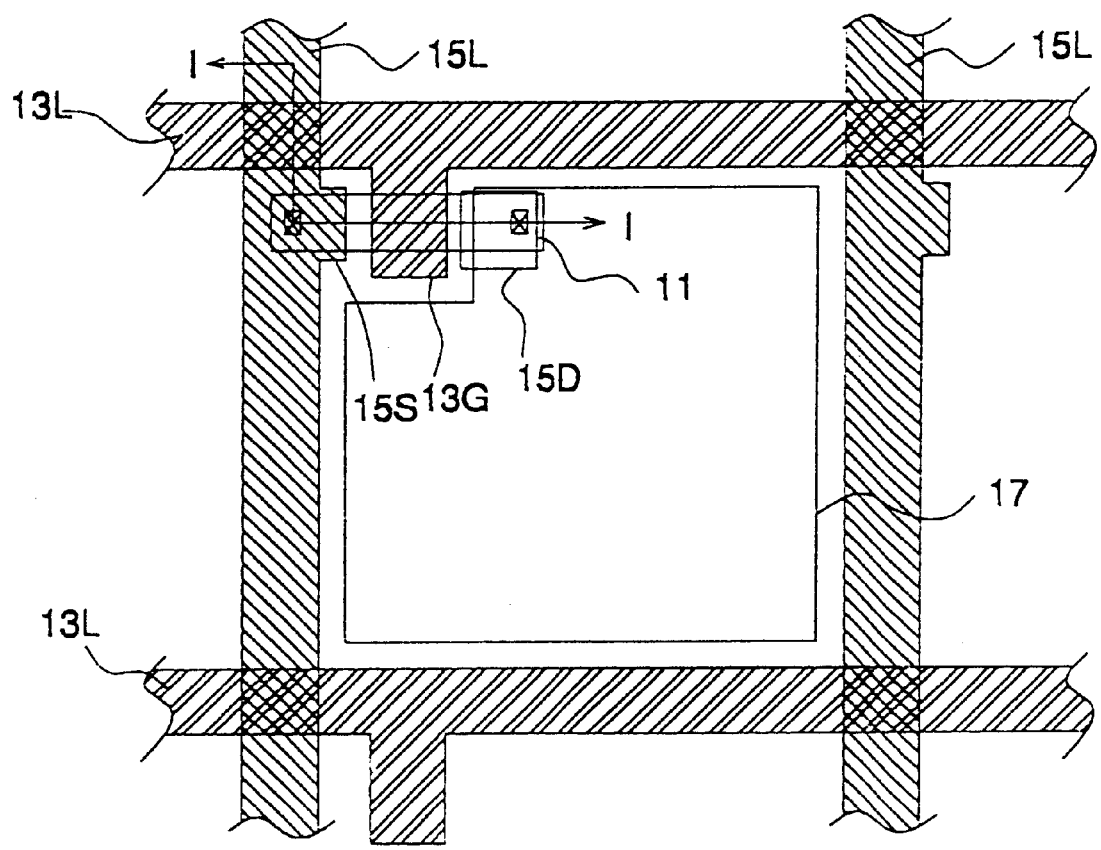
FIG. 1 is a plan view showing an LCD according to a related art.
Figure 2:
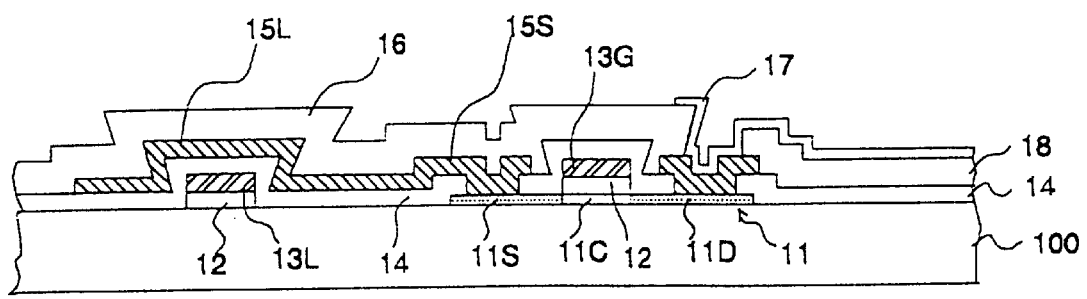
FIG. 2 is a cross-sectional view along a line I—I in FIG. 1.
Figure 3A:
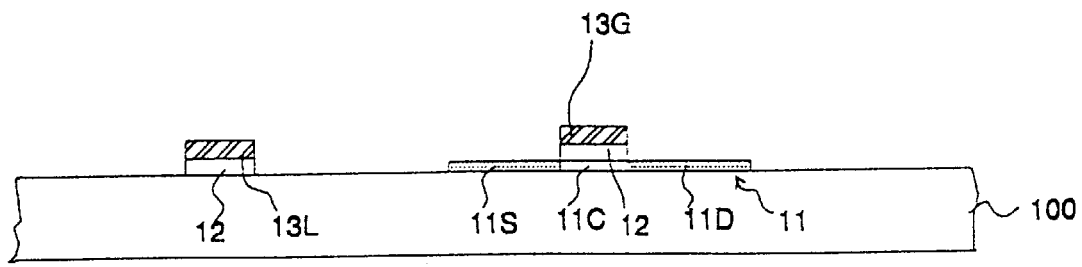
FIGS. 3A to 3D show cross-sectional views of a method of fabricating an LCD according to a related art shown in FIGS. 1 and 2.
Figure 3B:
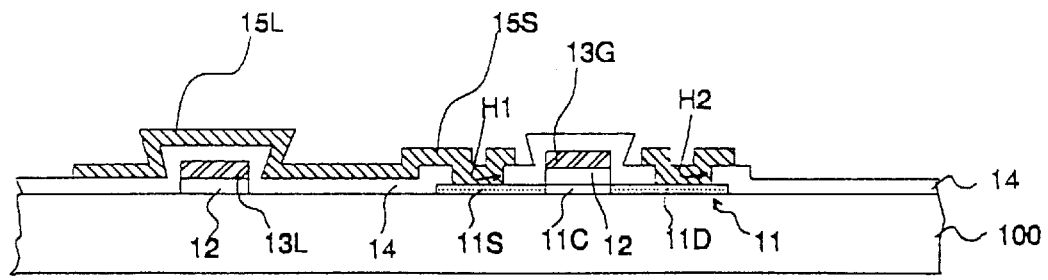
Figure 3C:
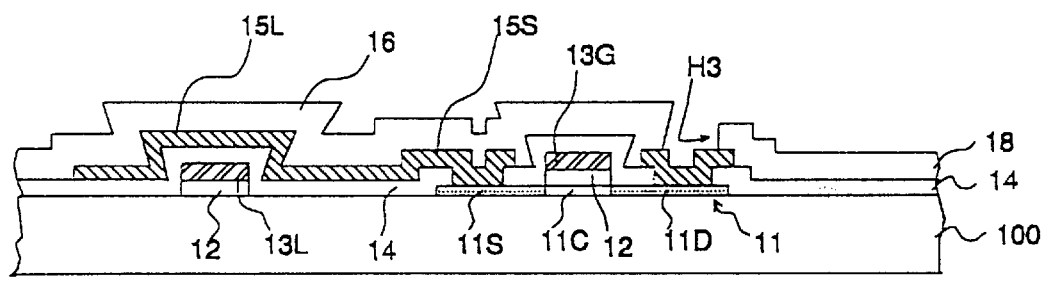
Figure 3D:
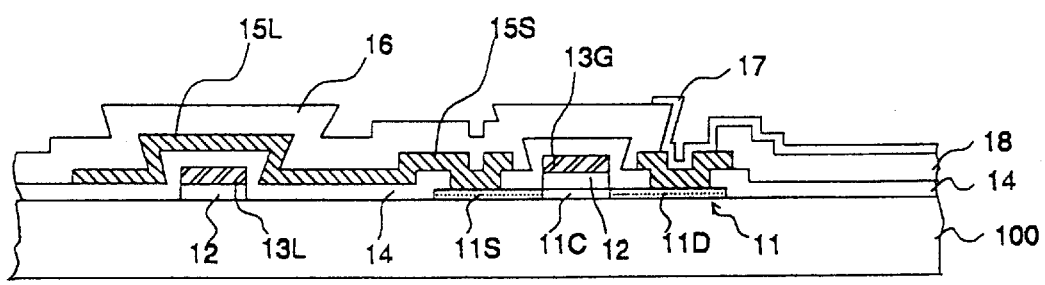
Figure 4:
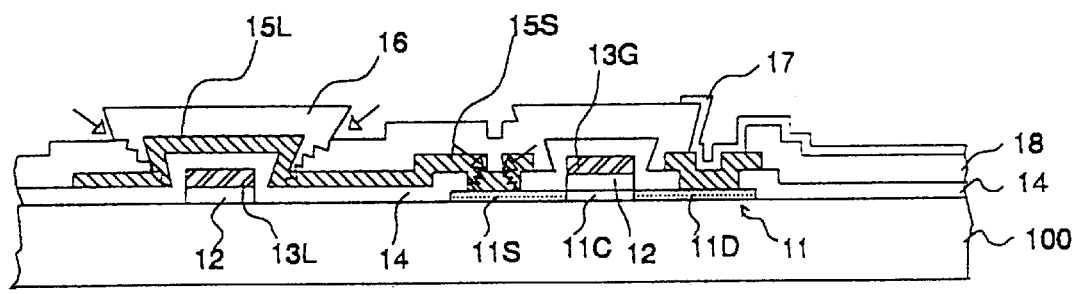
FIG. 4 is a cross-sectional drawing showing the line open during the manufacturing process of the LCD according to the related art.
Figure 5:
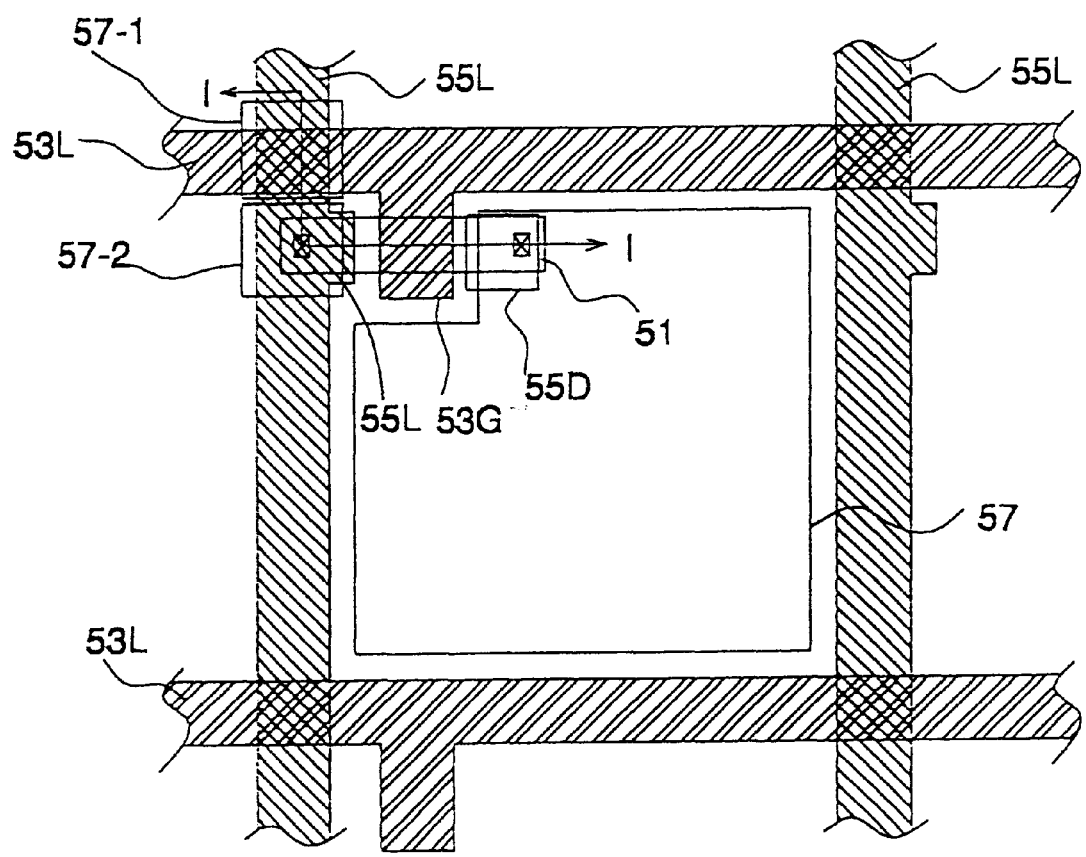
FIG. 5 is a plan view showing an LCD according to a first preferred embodiment of the present invention.
Figure 6:
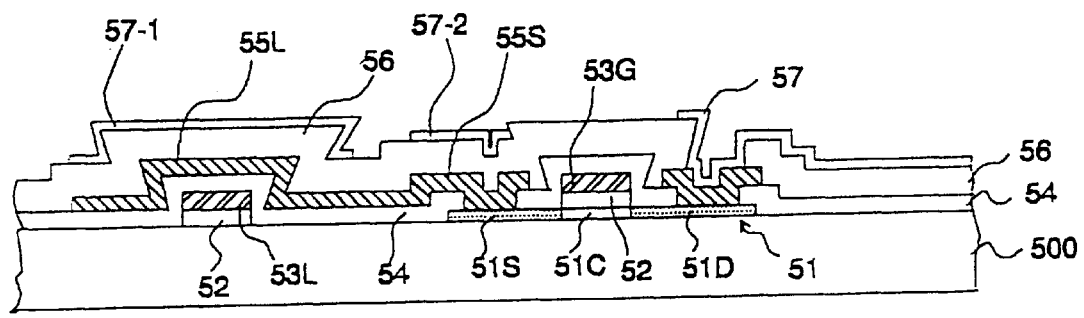
FIG. 6 is a cross-sectional view along a line I—I in FIG. 5.

FIGS. 5 and 6 are drawings showing a LCD according to a first preferred embodiment of the present invention, in which FIG. 5 is a plan view and FIG. 6 is a cross-sectional view along a line II—II in FIG. 5.

An active layer 51 having a source region 51S, a channel region 51C and a drain region 51D is formed on a substrate 500. A gate line 53L and a gate electrode 53G overlapping the channel region 51C are formed. A gate insulating layer 52 is formed underneath the gate electrode 53G and a gate line 53L, thereby being isolated with the active layer 51.

An insulating interlayer 54 is formed to cover the exposed surface of the substrate including the gate electrode 53G and the gate line 53L. Contact holes to expose portions of the source region 51S and the drain region 51D are formed in the insulating interlayer 54, respectively. A data line 55L having a source electrode 55S connected to the source region 51S is formed on the insulating interlayer 54.

A drain electrode 55D is connected to the exposed drain electrode 51D. The gate line 53L and the data line 55L cross over each other to define a matrix pattern and to form a plurality of pixel elements. A passivation layer 56 is formed to cover the exposed surface of the substrate including the data line 55L. A contact hole to expose a portion of the drain electrode 55D is formed in the passivation layer 56.

A pixel electrode 57P connected to the drain electrode 55D is formed on the passivation layer 56. Also, a first etching preventing layer 57-1 and a second etching preventing layer 57-2 are preferably formed on the passivation layer 56. The first etching preventing layer 57-1 and the second etching preventing layer 57-2 covers the crossing portion of the gate line 53L and the data line 55L and the contact hole portion having the slope side in the insulating interlayer 54, respectively. The first etching preventing layer 57-1 may be separated from the second etching preventing layer 57-2, as shown in FIG. 5 and also, the first etching preventing layer 57-1 and the second etching prevent layer 57-2 may be formed as a single integral body. It is also noted that three or more etching preventing layers may be provided, either separately or forming a single integral body.

FIGS. 7A to 7E show cross-sectional views of a method of fabricating an LCD shown in FIGS. 5 and 6.

Figure 7A:
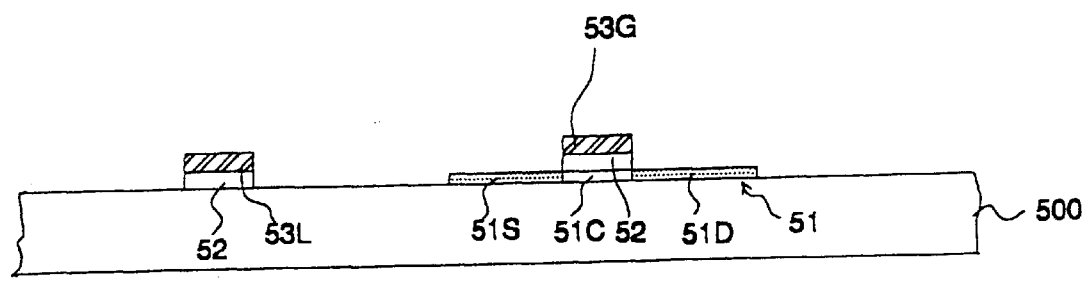
FIGS. 7A to 7D are cross-sectional views of a method of fabricating an LCD according to a related art shown in FIGS. 5 and 6.

Referring to FIG. 7A, an amorphous silicon layer is deposited on a substrate 500 and is crystallized. The crystallized silicon layer is etched via photolithography to form an active layer 51.

An insulating layer for forming a gate insulating layer and a conductive layer for forming a gate line are deposited sequentially on the exposed surface of the substrate including the active layer 51. The conductive layer is etched via photolithography to form a gate electrode 53G and a gate line 53L and then, the insulating layer is etched using the gate electrode 53G as a mask to form a gate insulating layer 52.

A source region 51S and a drain region 51D are formed in the active layer by doping impurities in the exposed portion of the active layer 51 using the gate line and the gate electrode as a doping mask. The channel region 51C is defined between the source region 51S and the drain region 51D.

Figure 7B:
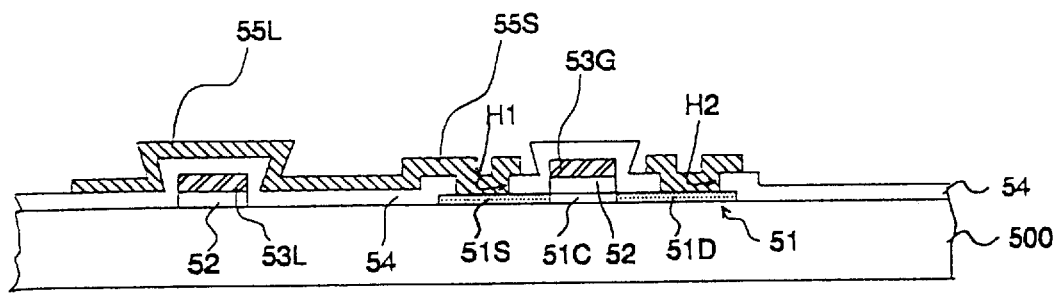

Referring to FIG. 7B, an insulating interlayer 54 is deposited on the exposed surface of the substrate including the gate line 53L and the gate electrode 53G. Then, contact holes H1 and H2 exposing the portions of the source region 51S and the drain region 51D are formed in the insulating interlayer 54, respectively, by etching the insulating interlayer 54 via photolithography.

A conductive layer for forming a data line including a source electrode and a drain electrode, for example, an Al layer, an Al alloy layer or the like, is deposited on the exposed surface of the substrate and etched via photolithography to form a source electrode 55S, a data line 15L and a drain electrode 55D. The source electrode 55S is connected to the source region 51S, the data line 55L is extended from the source electrode 55S and the drain electrode 55D is connected to the drain region 51D.

Figure 7C:
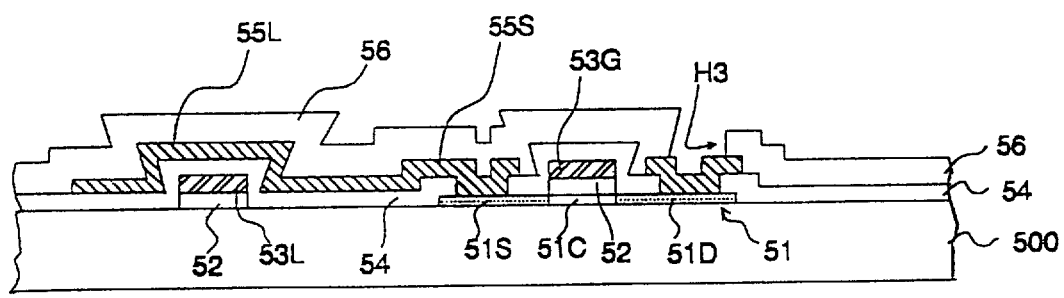

Referring to FIG. 7C, a passivation layer 56 is deposited on the exposed surface of the substrate and etched via photolithography to form a contact hole exposing a portion of the drain electrode 55D.

Figure 7D:
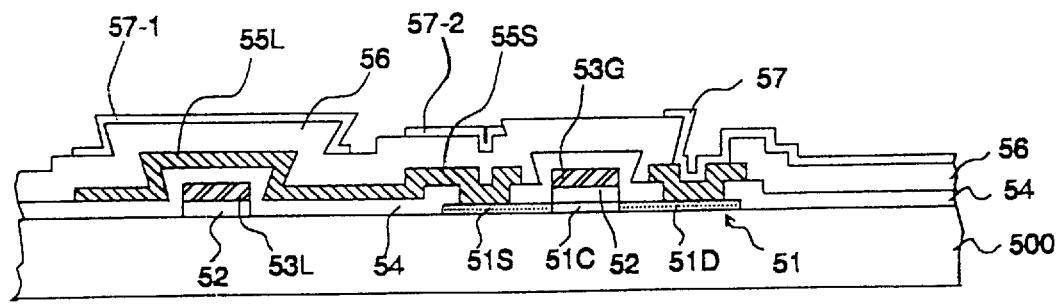

Referring to FIG. 7D, a transparent conductive layer, for example, Indium Tin Oxide ("ITO") layer is deposited on the exposed surface of the substrate and etched via photolithography to form a pixel electrode 57 connected to the drain electrode 55D, a first etching preventing layer 57-1 covering the crossing portion of the gate line 53L and the data line 55L and the second etching preventing layer 57-2 covering the contact hole portion having the slope side in the insulating interlayer 54.

Herein, the ITO etchant for etching the ITO layer may be a mixed solution of $FeCl_2$, HCl and $HNO_3$. The first etching preventing layer 57-1 and the second etching preventing layer 57-2 are preferably formed by being allowed to remain and without being etched during the process of manufacturing the pixel electrode. Accordingly, the first etching preventing layer 57-1 and the second etching preventing layer 57-2 prevent the ITO etchant from penetrating into the passivation layer, especially at the portion of the step difference and also prevent melting of the data line and the drain electrode.

The first etching preventing layer 57-1 may be separated from the second etching preventing layer 57-2, as shown in FIG. 7D and also, the first and the second etching preventing layers 57-1 and 57-2 may be formed as a single integral body.

Figure 8:
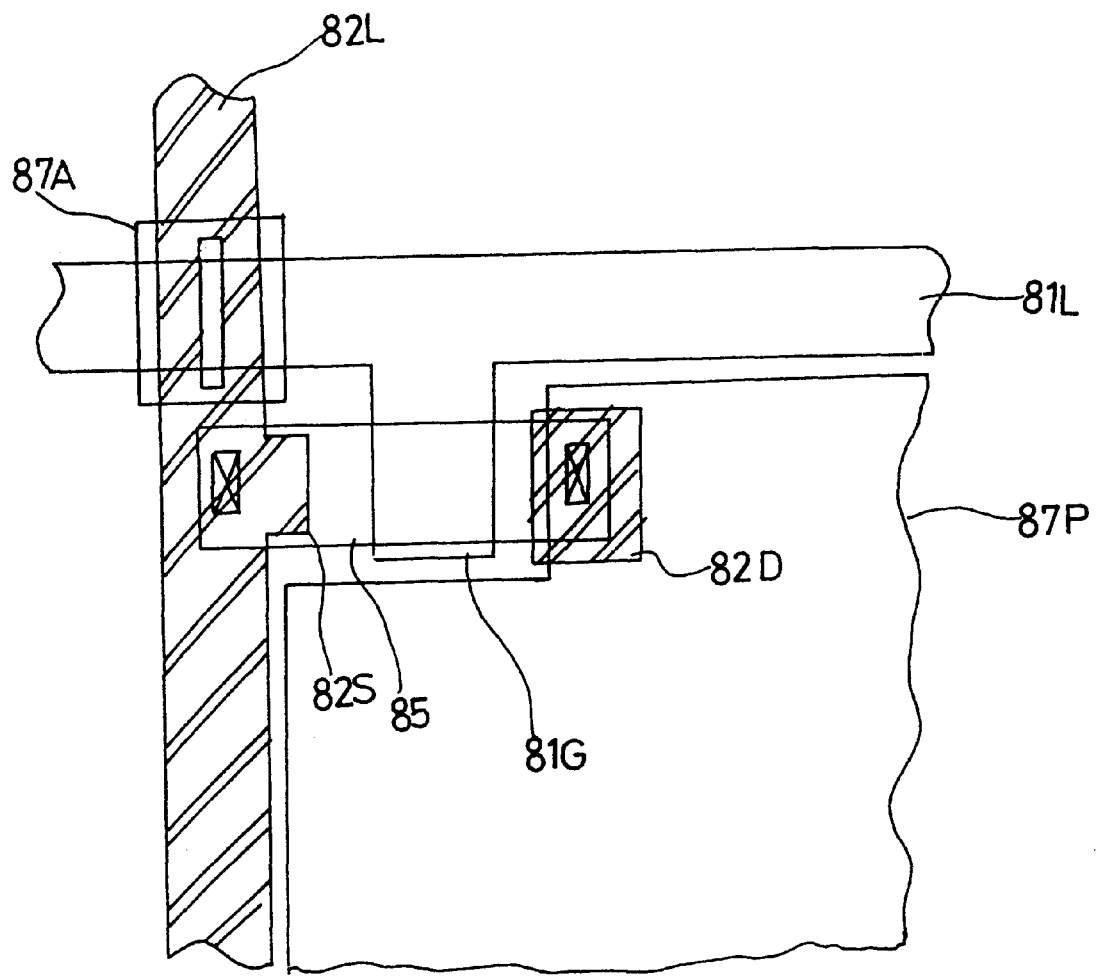
FIG. 8 is a plan view showing an LCD according to a second preferred embodiment of the present invention.

FIG. 8 is a plan view showing an LCD according to a second preferred embodiment of the present invention.

A gate line 81L including a gate electrode 81G crosses over a data line 82L including a source electrode 82S. A drain electrode 82D is formed corresponding to the source electrode 82S. The portion of the data line 82L located at the crossing portion of the gate line 81L and the data line 82L diverges into two branches.

The active layer 85 overlaps the source electrode 82S, the drain electrode 82D and the gate electrode 81G selectively, thereby forming a switching device. A pixel electrode 87P is connected to the drain electrode 82D. An etching preventing layer 87A made of a same material as the pixel electrode 87P covers the crossing portion of the gate line 81L and the data line 82L.

The pixel electrode formed by a transparent conductive layer including ITO or the like is deposited and etched via photolithography with an ITO etchant. Herein, the etching preventing layer is formed by remaining thereon without being etched during the process of manufacturing the pixel electrode. Accordingly, the etching preventing layer prevents the ITO etchant from penetrating into the passivation layer.

A data line diverges into two branch data lines at the portion of the crossing of the data line and the gate line. Accordingly, the occurrence of a line open condition is eliminated. Thus, one of the two branch data lines is still connected and does not have a line open condition, although the other branch data line is damaged to an extent that a line open condition exists. In other words, the second preferred embodiment of the present invention has a redundancy effect of the data line.

The preferred embodiments of the present invention are preferably applied to a structure in which a conductive layer is formed over the portion having a step difference and an insulating layer is formed on the conductive layer and the portion having a step difference is exposed via the predetermined etchant in order to prevent the conductive layer at the step difference portion from being melted by the etchant.

Preferred embodiments of the present invention prevent the conductive layer at the step difference portion from being damaged or melted by the etchant and therefore, prevents occurrence of line open conditions. Preferred embodiments of the present invention prevent line open conditions by forming the etching preventing layer or layers over the step difference portion created at the location of crossing over of the gate line and the data line or forming the contact hole in the insulating layer.

It will be apparent to those skilled in the art that various modifications and variations can be made to preferred embodiments of the present invention including a method of manufacturing a liquid crystal display of the present invention without departing from the spirit or scope of the present invention. Thus, it is intended that the present invention cover the modifications and variations of this invention as would be recognized by those of ordinary skill in the art to fall within the scope of the appended claims and equivalents.

What is claimed is:

1. A liquid crystal display, comprising:
   a substrate;
   an active layer on the substrate, the active layer having a source region, a channel region and a drain region;
   a gate line including a gate electrode, the gate electrode overlapping the channel region of the active layer and the gate line having a gate insulating layer disposed underneath;

an insulating interlayer covering the exposed surface of the substrate including the gate line;

a first contact hole and a second contact hole exposing portions of the source region and the drain region in the insulating interlayer, respectively;

a data line including a source electrode on the insulating interlayer, the source electrode connected to the source region and the data line is arranged to cross over the gate line;

a drain electrode on the insulating interlayer, the drain electrode connected to the drain region;

a passivation layer covering the exposed surface of the substrate including the data line and the drain electrode;

a third contact hole exposing a portion of the drain electrode on the passivation layer;

a pixel electrode connected to the drain electrode on the passivation layer; and at least one protection layer comprising a portion of the layer used to form the pixel electrode that is left over the crossing portion of the gate line and the data line during the etching process.

2. The liquid crystal display according to claim 1, further comprising a second protection layer covering a portion of the first contact hole.

3. The liquid crystal display according to claim 2, wherein the first and second protection layers comprise a single integral body.

4. The liquid crystal display according to claim 2, wherein the first and second protection layers are made of a material used for forming the pixel electrode.

5. The liquid crystal display according to claim 1, wherein the data line diverges to define two branch data lines at the crossing portion of the gate line and the data line.

6. A liquid crystal display comprising:

a gate line;

a data line crossing over the gate line to form a plurality of pixel elements having a matrix pattern;

a thin film transistor including a source electrode, a drain electrode connected to a pixel electrode and a gate electrode; and a protection layer comprising a portion of the layer used to form the pixel electrode that is left over the crossing portion of the gate line and data line during the etching process.

7. The liquid crystal display according to claim 6, wherein the protection layer being made of a material used to form the pixel electrode.

8. The liquid crystal display according to claim 6, wherein the protection layer is formed at a portion having a step difference.

9. The liquid crystal display according to claim 6, further comprising a second protection layer arranged to cover portion of a contact hole.

10. The liquid crystal display according to claim 9, wherein the first and second protection layers comprise a single integral body.

11. The liquid crystal display according to claim 9, wherein the first and second protection layers are made of a material used for forming the pixel electrode.

12. The liquid crystal display according to claim 6, wherein the data line diverges to define two branch data lines at the crossing portion of the gate line and the data line.

13. A method for fabricating a liquid crystal display, comprising the steps of:

forming an active layer on a substrate;

forming a gate line including a gate electrode, the gate electrode overlapping a selected portion of the active layer and the gate line having a gate insulating layer lying underneath the gate line;

forming an insulating interlayer to cover the exposed surface of the substrate including the gate line;

forming a source region and a drain region in the active layer by doping impurities using the gate electrode as a doping mask, the selected portion of the active layer being defined as a channel region;

forming a first contact hole exposing a portion of the source region and a second contact hole exposing a portion of the drain region in the insulating interlayer;

forming a data line including a source electrode and a drain electrode on the insulating interlayer on the insulating interlayer, the source electrode connected to the source region and the data line crossing over the gate line and the drain electrode connected to the drain region;

forming a passivation layer to cover the exposed surface of the substrate including the data line and the drain electrode;

forming a third contact hole in the passivation layer to expose a portion of the drain electrode; and forming a pixel electrode and at least one etching preventing layer on the passivation layer, the pixel electrode connected to the drain electrode and the at least one protection layer comprising a portion of the layer used to form the pixel electrode that is left over the crossing portion of the gate line and data line during the etching process.

14. The method for fabricating a liquid crystal display according to claim 13, wherein the pixel electrode is formed from an ITO material.

15. The method for fabricating a liquid crystal display according to claim 13, wherein the data line comprising the source electrode and the drain electrode are formed from a conductive material including at least one of Al and an Al alloy.

16. The method for fabricating a liquid crystal display according to claim 13, further comprising the step of forming a second protection layer, the second protection layer covering the portion of the first contact hole.

17. The method for fabricating a liquid crystal display according to claim 16, wherein the first and the second protection layers are formed as single integral body.

* * * * *